(12) United States Patent
Benjamin et al.

(10) Patent No.: US 12,505,138 B1
(45) Date of Patent: *Dec. 23, 2025

(54) IDENTIFYING AND RANKING POTENTIALLY PRIVILEGED DOCUMENTS USING A MACHINE LEARNING TOPIC MODEL

(71) Applicant: Text IQ, Inc., New York, NY (US)

(72) Inventors: Ethan Benjamin, New York, NY (US); Apoorv Agarwal, New York, NY (US)

(73) Assignee: RELATIVITY ODA LLC, Chicago, IL (US)

(*) Notice: Subject to any disclaimer, the term of this patent is extended or adjusted under 35 U.S.C. 154(b) by 494 days.

This patent is subject to a terminal disclaimer.

(21) Appl. No.: 18/190,795

(22) Filed: Mar. 27, 2023

Related U.S. Application Data

(63) Continuation-in-part of application No. 16/590,944, filed on Oct. 2, 2019, now Pat. No. 11,631,021.

(Continued)

(51) Int. Cl.
   *G06F 16/334* (2025.01)
   *G06F 16/353* (2025.01)
   (Continued)

(52) U.S. Cl.
   CPC ........ *G06F 16/3346* (2019.01); *G06F 16/353* (2019.01); *G06F 40/284* (2020.01);
   (Continued)

(58) Field of Classification Search
   CPC .................................................. G06Q 50/18
   See application file for complete search history.

(56) References Cited

U.S. PATENT DOCUMENTS

| | | | |
|---|---|---|---|
| 9,715,495 B1* | 7/2017 | Tacchi | G06F 40/30 |
| 2010/0312725 A1* | 12/2010 | Privault | G06N 5/043 |
| | | | 706/54 |

(Continued)

OTHER PUBLICATIONS

Jyothi K Vinjumur, "Predictive Coding Techniques With Manual Review to Identify Privileged Documents in E-Discovery" Dissertation submitted to the Faculty of the Graduate School of the University of Maryland, Doctor of Philosophy Spring, 2018. https://doi.org/10.13016/M2FB4WQ19 (Year: 2018).*

(Continued)

*Primary Examiner* — Richemond Dorvil
*Assistant Examiner* — Alexander G Marlow
(74) *Attorney, Agent, or Firm* — Maschoff Brennan

(57) ABSTRACT

A method for identifying and ranking potentially privileged documents using a machine learning topic model may include receiving a set of documents. The method may also include, for each of two or more documents in the set of documents, extracting a set of spans from the document, generating, using a machine learning topic model, a set of topics and a subset of legal topics for the set of spans, generating a vector of probabilities for each span with a probability being assigned to each topic in the set of topics for the span, assigning a score to one or more spans in the set of spans by summing the probabilities in the vector that are assigned to a topic in the subset of legal topics, and assigning a score to the document. The method may further include ranking the two or more documents by their assigned scores.

20 Claims, 5 Drawing Sheets

Related U.S. Application Data

(60) Provisional application No. 62/740,775, filed on Oct. 3, 2018.

(51) Int. Cl.
*G06F 40/284* (2020.01)
*G06F 40/44* (2020.01)
*G06N 7/01* (2023.01)
*G06Q 50/18* (2012.01)

(52) U.S. Cl.
CPC ............... *G06F 40/44* (2020.01); *G06N 7/01* (2023.01); *G06Q 50/18* (2013.01)

(56) References Cited

U.S. PATENT DOCUMENTS

| | | |
|---|---|---|
| 2014/0149298 A1 | 5/2014 | Wolf et al. |
| 2016/0224544 A1 | 8/2016 | Tristan et al. |
| 2019/0087489 A1 | 3/2019 | Culhane et al. |

OTHER PUBLICATIONS

R. Chhatwal, N. Huber-Fliflet, R. Keeling, J. Zhang and H. Zhao, "Empirical evaluations of active learning strategies in legal document review," 2017 IEEE International Conference on Big Data (Big Data), 2017, pp. 1428-1437, doi: 10.1109/BigData.2017.8258076. (Year: 2017).*

D. Fleurbaaij, M. Scanlon and N.-A. Le-Khac, "Privileged Data Within Digital Evidence," 2017 IEEE Trustcom/BigDataSE/ICESS, 2017, pp. 737-744, doi: 10.1109/Trustcom/BigDataSE/ICESS.2017.307. (Year: 2017).*

S. Joshi, P. M. Deshpande and T. Hampp, "Improving the Efficiency of Legal E-Discovery Services Using Text Mining Techniques," 2011 Annual SRII Global Conference, 2011, pp. 448-455, doi: 10.1109/SRII.2011.97. (Year: 2011).*

Gordon V. Cormack, Maura R. Grossman, Bruce Hedin, Douglas W. Oard "Overview of the TREC 2010 Legal Track" retrieved from https://trec.nist.gov/oubs/trec 19/papers/LEGAL10.OVERVIEW.pdf (Year: 2010).*

* cited by examiner

Figure 2

| Topic No. in Set T | Topic is Member of Set T | Topic is Member of Subset $T_L$ | Value of Dimension in Probability Vector D |
|---|---|---|---|
| 1 | YES | n | .1 |
| 2 | YES | YES | .05 |
| 3 | YES | n | .1 |
| 4 | YES | n | .03 |
| 5 | YES | YES | .08 |
| 6 | YES | YES | .1 |
| 7 | YES | n | .17 |
| 8 | YES | YES | .15 |
| 9 | YES | n | .1 |
| 10 | YES | n | .12 |
|  |  |  | Total = 1.0 |

IDENTIFYING AND RANKING POTENTIALLY PRIVILEGED DOCUMENTS USING A MACHINE LEARNING TOPIC MODEL

CROSS-REFERENCE TO A RELATED APPLICATION

This application claims the benefit of, and priority to, U.S. application Ser. No. 16/590,944, filed Oct. 2, 2019, which claims the benefit of and priority to U.S. Provisional Application No. 62/740,775, filed Oct. 3, 2018, both of which are incorporated herein by reference in their entireties.

BACKGROUND

The searching of electronic data for evidence, often referred to as e-discovery, has become a ubiquitous part of litigation proceedings and legal investigations. Various software may be utilized to manage electronic documents, communications, and the like to facilitate search and classification of the electronic data. One important facet of the e-discovery process is review of the electronic data for information protected by privilege under attorney-client privilege or attorney work product.

Privileged information may include not only communications between attorneys and their clients (including employees of the client) regarding legal advice, but also communications between employees of the client discussing the legal advice given to them by the attorney. Attorneys may be both outside counsel and in-house counsel. In organizations, it is common for attorneys to have legal assistants, including paralegals or secretaries, who may convey legal advice on behalf of the attorneys. Even though legal assistants may not be attorneys themselves, their communications may also be considered privileged. Accordingly, there may be many non-attorneys acting on behalf of attorneys who may confer privilege in their communications.

Conventionally, e-discovery has been performed by executing searches of the electronic data for keywords relating to the litigation or investigation, and perhaps searching for names of attorneys representing a party in the legal proceeding. Conventional e-discovery may have several shortcomings. The accuracy of the privilege review may be less than optimal, as keyword and name searches may fail to identify items that include a legal discussion without naming an attorney, or items where a user simply did not know which keywords or names to search. Consistency of review may also be a problem, as different reviewers may have different opinions as to whether or not a document is privileged or may use searches with varying keywords or names. While quality control may be applied to the results of an e-discovery privilege review, these quality control processes may identify new keywords or names that may be searched, which may lead to a recursive process that is time-consuming and expensive, as each time an unsearched keyword is found, a new review of the entirety of the electronic data may be warranted. An additional shortcoming of conventional e-discovery is that after potentially privileged documents are identified, it may be inefficient to review all the documents identified as potentially privileged without additional guidance on the documents.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying and ranking potentially privileged documents using a machine learning topic model may be performed, at least in part, by a computer system including one or more processors. The method may include receiving, by the computer system, a set of documents. The method may also include, for each of two or more documents in the set of documents, extracting, by the computer system, a set of spans from the document, generating, by the computer system using a machine learning topic model, a set of topics and a subset of legal topics in the set of topics for the set of spans, generating, by the computer system, a vector of probabilities for each span in the set of spans with a probability being assigned to each topic in the set of topics for the span, assigning, by the computer system, a score to one or more spans in the set of spans by summing the probabilities in the vector that are assigned to a topic in the subset of legal topics, and assigning, by the computer system, a score to the document, with the score indicating a potential that the document is privileged, and with the score being equal to the highest score of the scores assigned to the one or more spans in the set of spans. The method may further include ranking, by the computer system, the two or more documents based on the scores assigned to the two or more documents.

In some embodiments, the method may further include labelling, by the computer system, a document in the set of documents as potentially privileged if the document has a score above a certain threshold.

In some embodiments, the method may further include generating, by the computer system, a master set of topics for multiple documents in the set of documents, the set of topics being a subset of the master set of topics.

In some embodiments, the assigning, by the computer system, of a score to the one or more spans in the set of spans may not be performed for a span if at least one of: a language of the span is unknown or cannot be detected, a number of tokens in the span is less than a threshold, and the number of tokens in the span is less than the threshold after names are removed from the span.

In some embodiments, the method may further include altering, by the computer system, the score assigned to a span if a sender or a recipient of the document containing the span is a legal entity.

In some embodiments, the method may further include altering, by the computer system, the score assigned to a document in the set of documents if a sender or a recipient of the document containing the span is a legal entity.

In some embodiments, the method may further include altering, by the computer system, the score assigned to a span if the span contains a mention of a legal entity.

In some embodiments, the method may further include altering, by the computer system, the score assigned to a document if the document contains a mention of a legal entity.

In some embodiments, the method may further include creating, by the computer system, a hypergraph including a set of entities based on communications between the set of entities in the set of documents, and weighting, by the computer system, an edge between one or more entities in the set of entities if the communications between the one or more entities is potentially privileged. In these embodiments, the method may further include altering, by the computer system, the score assigned to a document in the set of documents if the document is a communication between entities with a weighted edge in the hypergraph.

In some embodiments, one or more non-transitory computer-readable media may include one or more computer-readable instructions that, when executed by one or more processors of a computer system, cause the computer system to perform a method for identifying and ranking potentially privileged documents.

It is to be understood that both the foregoing summary and the following detailed description are explanatory and are not restrictive of the invention as claimed.

BRIEF DESCRIPTION OF THE DRAWINGS

Embodiments may be described and explained with additional specificity and detail through the use of the accompanying drawings in which:

FIG. 2 is a table illustrating a set of topics, a subset of legal topics, and a probability vector for an example span.

DETAILED DESCRIPTION

Conventional e-discovery that involves simple keyword and names searches may be relatively inaccurate, inconsistent, time-consuming, expensive, and inefficient.

Some embodiments of this disclosure may involve identifying and ranking potentially privileged documents using a machine learning topic model. For example, some embodiments may involve receiving a set of documents, using a machine learning topic model to automatically assign a score for each document (with the score indicating a potential that the document is privileged), and ranking the set of documents by their assigned scores.

Alternately or additionally, some embodiments may include systems and methods for processing electronic communications to analyze and identify documents that are potentially privileged, such as under attorney-client privilege, attorney work product, or another legal professional privilege. In these and other embodiments, a processor of a computer having memory may receive documents to be analyzed for potential legal privilege. The processor may split the documents into smaller components for analysis, which may be referred to as spans. A topic model generator may produce a set of topics and topic weights for individual documents or for spans within the documents. The legal topics within the set of topics may be identified. The identified legal topics may be used to determine a score for the individual documents or for spans within the documents.

Alternately or additionally, in some embodiments, a processor of a computer having memory may receive a set of documents from one or more databases. The processor may generate a set of topics for each span in the set of documents. The set of topics may include a subset of legal topics. The processor may generate a vector for each span. The vector may include topics and topic weights. A probability may be assigned to each topic in the set of topics. In these and other embodiments, a score may be assigned to each span by summing the probabilities in the vector that are assigned to a topic in the subset of legal topics. In response to the documents being split into smaller components, such as spans, a score may be assigned to a document, where the score of the document may be the highest score for one of the spans within the document. The scores for documents may be used to determine the order in which to analyze the documents to identify privileged communications. Alternately or additionally, a document may be marked as potentially privileged if the score for the document is above a threshold.

These embodiments may result in an e-discovery process that is relatively more accurate, more consistent, less time-consuming, less expensive, and/or more efficient than conventional e-discovery.

Figure 1:
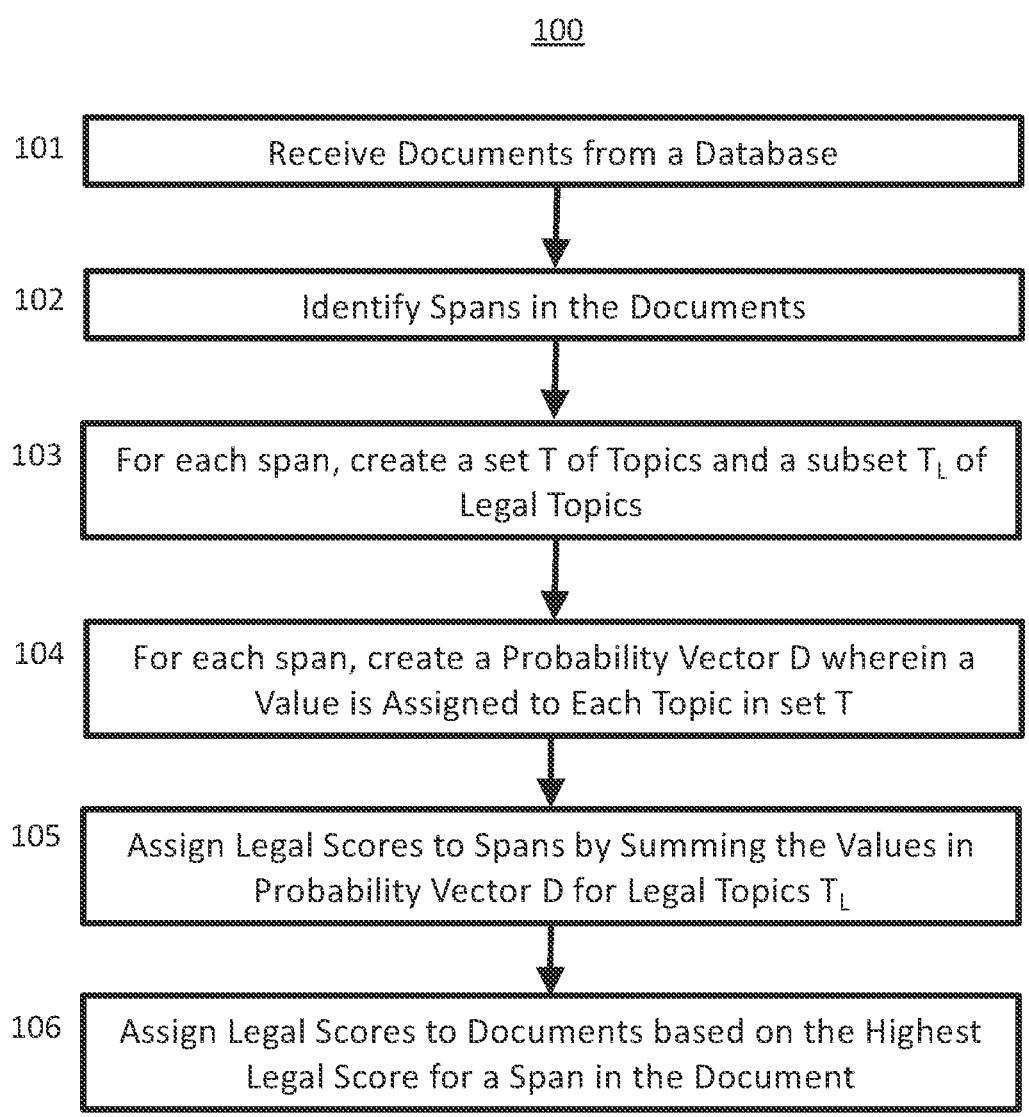
FIG. 1 is flowchart of an example method for analyzing large databases of electronic communications for documents that are potentially privileged.

FIG. 1 illustrates some embodiments for reviewing a dataset of electronic documents to analyze and/or identify communications that are potentially privileged. For example, FIG. 1 illustrates a flowchart of an example method 100 to analyze large databases of electronic communications and other documents for documents that are potentially privileged. One or more of the operations of the method 100 may be performed, in some embodiments, by any suitable device or system described in this disclosure. In these and other embodiments, the method 100 may be performed based on the execution of instructions stored on one or more non-transitory computer-readable media. Although illustrated as discrete steps, various steps may be divided into additional steps, combined into fewer steps, or eliminated, depending on the desired implementation.

In some embodiments, a processor receives a set of documents from one or more databases at step 101. The processor may process the dataset on a document-by-document basis, or the processor may split the received documents into smaller components to perform the analysis. In some embodiments, at step 102 the documents are split into smaller parts which may be referred to as spans. There are many methods by which a document may be divided into smaller parts, such as by paragraphs, sentences, chapters, sections, or any method that splits the document using regular expressions. For example, a span may be a paragraph such that a document may contain multiple spans. Various forms and types of documents may be analyzed by the disclosed subject matter: the document may be a communication (such as an email) or some other document that is being analyzed for legally privileged content.

In some embodiments, an assessment may be made whether the document warrants being scored to assess whether the document is potentially privileged. For example, a document may not warrant being scored if the document is empty. As another example, if a document has a file extension suggesting that the document is not a text document but rather some other data type, for example jpg, bmp, png, gif, then the document may not warrant being scored.

In some embodiments, tokens are gathered for each span in the document. The span may be split into smaller parts to produce tokens. For example, a token may be a word or phrase in the span. A tokenizer may be used to extract tokens for each span. In an embodiment, a standard tokenizing software, such as an Elasticsearch tokenizer, may be used for token extraction.

In some embodiments, a determination is made whether the span may be analyzed or skipped in the analysis. A span may be skipped by the disclosed subject matter for various reasons. As an example, a span may be skipped if the language is unknown or cannot be detected. As another example, a span may be skipped if the number of tokens is less than a threshold. Optionally, names may be automatically removed from the spans, and a span may be skipped such that the span is not analyzed if the number of tokens is less than a threshold after names are removed.

In some embodiments, a topic model generator may be employed to generate topics for analysis. The topic model generator may take a set of documents or spans as an input and may output: (1) a set of topics, and/or (2) a set of topic weights. The number of topics generated by the topic model may be specified by a user in advance or obtained from an algorithm based on the set of documents or spans. Various topic model generators may be used in conjunction with the disclosed subject matter, such as a Latent Dirichlet Allocation (LDA) machine learning topic model or any other machine learning topic model. For example, other topic model generators may include Latent Semantic Analysis, Correlated Topic Modeling, Probabilistic Latent Semantic Analysis, non-negative matrix factorization (NMF), Parallel Latent Dirichlet Allocation (PLDA), Pachinko Allocation Model (PAM), Top2Vec, BERTopic, Ida2vec, Gibbs Sampling Dirichlet Multinomial Mixture (GSDMM), and Dirichlet Multinomial Mixture, among other types of topic models and/or derivates of these topic models.

In some embodiments, to generate topics for analysis, the topic model generator may generate one or more vectors for a set of documents or spans that are input to the topic model generator. For example, the one or more vectors may be a matrix. In these and other embodiments, the vectors may include the words from the set of documents or spans that are input to the topic model generator. The topic model generator may be applied to the one or more vectors to generate the topics of analysis. For example, the one or more vectors may be used as an input to the topic model generator to generate the topics of analysis.

As an example of generation of a set of topics and/or a set of topic weights for a document, a topic model generator may take a document from a dataset and tokenize the document such that a token is generated for each word or phrase in the document. For example, the sentence "a colleague sent the message yesterday" may be tokenized into six tokens where each token is a unique word. The set of all tokens generated for the set of documents may be referred to as the vocabulary. The topic model generator may also generate a set All_T of topics from a set of documents. An individual topic may be represented by one or more tokens, such as by the tokens with the highest probability for the topic. Using the example sentence above as a topic, the topic may be represented by the six tokens that include the topic, or the topic may be represented by a subset of those six tokens.

In some embodiments, the topic model generator may also create a set All_$T_i$ of topic weights, in which a topic weight in All_$T_i$ may be illustrated as a die where each face is a different token. Using the example sentence above as the topic, the topic weight may be represented as ⅙ for each token if the probability of each token appearing in the topic is equal. The topic weights for the tokens including a topic may not always be equal and may be weighted so that some tokens have a higher probability and other tokens have a lower probability.

In some embodiments, the topic model generator may analyze an individual document within the dataset. As discussed above, the document may be split into spans. At step 103, the topic model generator may produce a set T of topics for each individual span, and a set $T_i$ of topic weights for the span. The set T of topics may be a subset of the set All_T of topics for the set of documents. The number of topics generated by the topic model for each span may be selected by a user or calculated using an algorithm. Each topic in the set T of topics may have a value in the set $T_i$ of topic weights that is a probability that may be representative of the degree that the topic is exhibited in the span or of the degree the span pertains to the topic. The set $T_i$ of topic weights may be normalized so that the sum of all the probabilities for the topic weights for the span in the set $T_i$ of topic weights is 1.0.

In some embodiments, the topic model generator may first produce a set of topics (and/or topic weights) for an initial set of documents. After the topic model generator has generated a topic model based on the initial set of documents, the topic model generator may be used to analyze additional spans using the topic model. The analysis of the additional spans may not alter the topics in the topic model. The topic model generator may analyze each additional span and generate a set of topics and topic weights for each span. As discussed above, a document may include multiple spans. The set of topics and topic weights for each span may be used to determine whether the document containing the span is potentially privileged.

In some embodiments, the topic model generator may produce a set of topics and topic weights for each span. At step 103, a set T is created for all topics for a particular span, and a subset of the set T for all topics is the set $T_L$ of legal topics. The set $T_L$ of legal topics may be identified through human analysis or by any algorithm that may identify legal topics, such as by analyzing tokens associated with the topic. In some embodiments, tokens associated with each topic may be presented to an annotator who reviews the tokens and determines whether to label the topic as legal or not legal. In these and other embodiments, the subset $T_L$ identifies legal topics, but $T_L$ may also be used to identify other issues that are being investigated by the disclosed subject matter.

In FIG. 2, the topic model generator has analyzed an example span A and has identified a set T of all topics and a subset $T_L$ of legal topics for the span. In the example, set T has 10 topics numbered 1 to 10 but subset $T_L$ only includes a subset of those 10 topics. More specifically, subset $T_L$ includes topics 2, 5, 6 and 8 in set T. Using set T and subset $T_L$, at step 104 a probability vector D is created where each dimension represents a topic in T. Using the example in FIG. 2, if there are ten topics {1 . . . t} in T, then a probability vector D has ten dimensions (where D[i] is the value of the vector in dimension i). In this example, four of the values in probability vector D may be dimensions that represent the topics in subset $T_L$ The values that represent the topics in subset $T_L$ may be represented by D[2], D[5], D[6], and D[8]. The value of a dimension in probability vector D may be representative of the degree to which the topic is exhibited in the span or of the degree the span pertains to the topic. The value dimensions in probability vector D may also be normalized so that a sum of the value dimensions is 1.0. Using span A as an example, if D has 10 dimensions then the sum of the 10 values from D[1] to D[10] is normalized at 1.0.

In some embodiments, at step 105 a score for span A may be calculated by summing all the values in probability vector D for subset of $T_L$ legal topics that are identified in the span. Example span A has four legal topics in subset $T_L$ of legal topics (topics nos. 2, 5, 6, and 8). The score for span A may be calculated by summing the values in probability vector D for the legal topics in subset $T_L$ of legal topics. In this instance, the values in D for the four topics respectively are 0.05, 0.08, 0.1, and 0.15. Accordingly, the score for span A is 0.38.

In accordance with an embodiment, to assign a score to a document, the spans in the document are identified first. After identifying the spans, a score is calculated for each of the spans in the document. At step 106, the score of the span with the highest score among the spans in the document is assigned as the final score for the document. In the event no spans in the document were scored (e.g., if none of the spans had enough tokens), then the entire document may be treated as a span and a score may be calculated for the document as if the document were a span. If the document itself is not a valid span, then the document may be scored as undefined.

The scores for documents may be used to determine the order in which to analyze the documents to identify privileged communications. The ranking of documents by scores may be helpful to prioritize the further analysis of the documents for privileged communications. The further analysis of the privileged nature of a document may be performed through human analysis or by another algorithm. Alternately or additionally, the scores for a document may be used to mark a document as potentially privileged if the score is above a certain threshold.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

The example method 100 may improve the functioning of a computer system itself and/or may improve the technical field of e-discovery. For example, the functioning of computer system (such as the example computing system 500 of FIG. 5) may itself be improved by the method 100 being implemented on the computer system and employing a machine learning model, such as an LDA machine learning topic model or any other machine learning topic model, to automatically assign a score for each document in a set of documents that indicates a potential that the document is privileged, and ranking the set of documents by their assigned scores. This ranking of documents may be done in a granular fashion that would be impossible without the use of a machine learning model, resulting in a more accurate ranking than may be achieved using general categories that are employed in conventional e-discovery. Thus, the example method 100 may improve the functioning of a computer system itself, and improve the technical field of e-discovery, by causing the computer system itself to perform e-discovery in a relatively more accurate, more consistent, less time-consuming, less expensive, and/or more efficient manner than conventional e-discovery.

In some embodiments, the accuracy of privilege analysis in the disclosed subject matter may be improved by identifying legal entities in the documents, which may be performed using an entity role detector. An entity may be assigned a legal role if the entity is an attorney or the entity is a non-attorney that is acting in a legal capacity to confer privilege in their communications. A privilege list may be received that includes multiple known attorney entities. The multiple known attorney entities may be a subset of the entities extracted from the documents, which may also include a set of unknown role entities. In some embodiments, a user may review and select the set of unknown role entities that may be predicted using the entity role detector.

As discussed above, tokens may be obtained for each document. Each document may also be associated with one or more entities. For example, if the document is an email then the sender or recipients of the email may be associated entities. Feature vectors may then be determined for each of the entities based on the extracted tokens of the documents associated with each entity. A feature extractor may be a function that takes a set of entities E and returns a map F from entities to a vector of decimals (also called a "feature vector"). The choice of a feature extractor that may be used may vary depending on the set of documents, and may include the following examples: Latent Dirichlet Allocation, Word2Vec, and BagofWords.

In some embodiments, a training machine learning function may be defined as a function that receives two inputs: a set of feature vectors corresponding to known legal entities ("positive examples"), and a set of feature vectors corresponding to known non-legal entities ("negative examples"). Given these inputs, the training machine learning function may return a machine learning model, which is a function that takes a feature vector and returns a role prediction of either legal or other/non-legal. Logistic regression may be used to classify the feature vectors.

The determined feature vectors of the known legal entities may be compared with determined feature vectors of each unknown role entity to generate a role prediction for each unknown role entity. In some embodiments, the role prediction may have a value of legal or other/non-legal. In some embodiments, the process of running a role detector and curating predicted legal entities may be repeated until the privilege analysis system stops predicting any more legal entities. In each cycle, the quality of predictions may improve as the role detector is able to better understand the nuances of the attorneys in the dataset.

In some embodiments, when the entity role detector finishes running, the user may be given options to verify the roles of entities. The roles of entities may be grouped into various legal and non-legal categories. The user may also have the option to change the role of individual entities within a category.

In some embodiments, to assign a score to a document, the spans in the document may be identified. Then a score may be calculated for each of the spans in the document. The score of the span with the highest score in the document may be assigned as the final score for the document. In some embodiments, the score for a span may be adjusted if legal entities are identified as the sender and/or recipient for the document containing the span, for example through the entity role detector. If the document is an email where the sender and/or recipient of the email is a legal entity, then the score for the span may be increased to adjust for the possibility that the email contains privileged communication. In some embodiments, the final score for a document may be adjusted based on the legal entities identified as the sender and/or recipient for the document. The adjustment to the scores may include weighting the scores based on the number of legal entities identified, the nature of the legal entities identified (such as whether the legal entities are attorneys or legal assistants), and whether the legal entities are principal actors in the relevant legal matter.

In some embodiments, once the legal entities in the documents have been identified, an entity mention detector may identify where the entities are mentioned within the text of the documents. In some embodiments, the entity mention detector may be preceded by an entity name verification step, where the user verifies the names of entities that have a legal role. After entity name verification is performed, entity mention detection may be executed.

The entity mention detector may detect the entities with legal roles within the documents in the dataset. In some embodiments, the entity mention detector may detect mentions of legal entities when mentioned with their proper first name or full name and when the legal entities are mentioned using their nicknames or other names. For example, for a legal entity with first name Elizabeth, the entity mention detector may detect mentions of Elizabeth and when the entity is mentioned with nicknames such as Beth, Liz or Lizzie. To detect nicknames or other names of a legal entity, a name variant table may be generated for each entity and accessed by a name entity recognition (NER) module. Each time name entity recognition starts, the entity mention detector may either update the existing table in the database, or create a new table (e.g., the first time the module is run). Once synchronized with input data (e.g., entities and emails), the table may determine which name variants may be searched to produce the requisite mentions. By persistently storing the table, the entity mention detector may determine how to resume work if the system pauses or if there is updated input data (e.g., new entities or entity roles). The name variant table may consist of multiple name variant rows, each with a unique name variant attribute. An example name variant table is shown in Table A below.

TABLE A

Name Variant Table

| Name Variant | Legal | Single Token | Candidates | ProcessedBy NER |
|---|---|---|---|---|
| john jacob schmidt | Y | N | E1, E2 | N |
| jim scott | N | N | E3, E4, E5 | Y |
| jim astor | N | N | E13, E14, E15 | Y |
| scott | Y | Y | E6, E7, E8, E9, E10 | N |

Each name variant table row may have multiple attributes, including some of the following attributes:
  row.Name Variant: the actual text of the name variant.
  row.Candidates: The set of all embryo entities that have row.NameVariant as a name variant.
  row.Legal: True if any entities e∈row.Candidates have e.Role=LEGAL, false otherwise.
  row.SingleToken: False if tokenizing row.NameVariant on non-alphanumerical characters produces many tokens, true otherwise.
  row.ProcessedByNER: True if NER has fully processed this row, false otherwise.

The named entity recognition process may produce a set of mentions. A mention is a piece of text in a document (such as an email) which may refer to a person. As stated above, the entity mention detector may identify variants of a known legal entity, such as a lawyer. For instance, given a lawyer "Jim Jacobsen," the search module may search for "Jim," "Jacobsen," "JJacobsen," and other possible aliases. To avoid errors, name variants that may subsume or intersect with lawyer name variants may also be searched. In some embodiments, if entities for lawyer "Jack Scott" and non-lawyer "Scott Cousins" (which each have the name variant "Scott") are identified, and no other entities with name variant "Scott" exist, then "Scott" is not resolved to the legal entity if "Scott" appears in the larger text "Scott Cousins."

After synchronizing the name variant table with current entities, the potentially legal name variants that are unprocessed may be obtained. To process such rows, as well as all rows that may subsume or intersect with unprocessed legal mentions, all tokens of unprocessed legal rows may be identified, and then all rows whose name variants contain these tokens may be retrieved. From this set of rows, single-token non-legal name variants, which cannot subsume a legal mention, may be excluded.

In some embodiments, name variant table rows may be processed in descending order of number of tokens and then by descending order of number of characters. Processing the name variant table rows in descending order of number of tokens and then by descending order of number of characters may help to ensure that supersets are found before subsets of the supersets. For each name variant, all or a majority of email spans may be located which include the name variant. In these and other embodiments, the following outcomes may be reached:
  1. If the span does not overlap with prior span, then persist the span.
  2. If the span is a proper subset of a longer existing span, then discard the span.
  3. If the span intersects with another existing span, then:
    (a) if both spans are legal, discard the shorter span.
    (b) else if both spans are non-legal, discard the shorter span.
    (c) if one span is legal and the other is non-legal, persist the legal span and discard the other.

Only single tokens name variants that are legal may be searched in some embodiments. By definition, a single token cannot intersect with any other mention; the single token may only be subsumed in another span. If subsumed, the single token name variant may be discarded. Because single-token name variants frequently do not refer to an actual name in text (for example "will" may be either a name or a verb), named entity tagging may be used to determine if a single token span refers to a person.

In some embodiments, based on the prediction of the entity tagger, the following outcomes may be reached for a given span:
  1. The span is tagged as a person and is not part of a larger person span: save the span as a mention.
  2. The span is tagged as a person but is part of a larger person span: determine if any multi-token name variant is a close misspelling of this span. If so, persist the mention as if the multi-token name variant referred to that name variant.
  3. Otherwise, the system does not persist the mention.

In some embodiments, in an example method for detecting and resolving entity mentions, the extracted tokens from the documents may be searched for entity mentions of the subset of entities having legal role values. Documents that include extracted tokens that are entity mentions may be identified using an entity mention detector.

Once the entity mention detector has finished identifying all or a majority of the mentions of legal entities, a name disambiguator (NDA) may map these mentions within documents to the entities in the dataset. For example, the legal entity Mary Cook may have been mentioned in an entity mention token as Mary. The name disambiguator may identify who this Mary is: is she Mary Cook or is she Mary Johnson? The name disambiguator may resolve entity mentions to help ensure that the Mary mentioned within that email is mapped to Mary Cook.

In some embodiments, these entity mentions may be resolved by comparing a joint distance/difference for every effective candidate entity for the entity mention that potentially references a legal entity. The joint distance for a candidate entity c in email e may be calculated as the sum of minimum graph distance from c to each email sender/recipients. For example, given a set of sender/recipient entities Re, email network N, and entity c, the joint distance to c for e may be: a summation of the DIST(N, r, c) for r∈Re, where DIST is the minimum distance between entities in a network. When choosing a winner among candidate entities for entity disambiguation, the candidate with the smallest joint distance may be selected, as the winner entity may has fewer degrees of separation to the email sender and recipients. The entity mention may be associated with the effective candidate entity having the smallest joint difference.

As part of name disambiguation, emails containing mentions with legal candidates may be identified and processed one at a time. For each email e, a mention dependency graph for the mentions may be determined. This mention dependence graph may capture the notion that if an email contains multi-token mentions like "Jim Johnson" and "Michael Jim Jacobsen", then a mention "Jim" in the same email should depend on the resolution of the larger mentions.

The name disambiguator may then determine that a multi-token mention mm contains a single-token mention $m_s$ if any tokens of mm are equal to the unique token $m_s$, or if any tokens of mm are the formal version of a nickname $m_s$. The latter condition accounts for cases where a person mentioned as "Joe" may be mentioned by a more formal version like "Joseph Jeffries" in the same email. The mention dependency graph may be a directed graph in which multi-word mentions have directed edges to single-token mentions which the multi-word mentions contain. For instance, in the above example "Jim Johnson" and "Michael Jim Johnson" would have a directed edge to "Jim." "Jim Johnson" would be a parent of "Jim". In the dependency graph, only vertices which are either potentially legal mentions or parents of potentially legal mentions may be retained.

The name disambiguator may then process each mention in the mention dependency graph in topological sorted order. This topological sorted order may help to ensure that no mention is processed before any parents the mentions depend on. For each mention m, if a mention has exactly one non-dummy parent $m_p$, m is resolved in the same manner as $m_p$. If a mention has one or more dummy parents, then m is marked as unresolvable, and its dummy parents are flagged. Otherwise, the mention may not be resolved solely from its parents. The intrinsic candidates of a mention m may be defined as the set of candidates produced by named entity recognition. If m has multiple non-dummy parents, then the effective candidates of m may be the intrinsic candidates of all parents of m. Otherwise, the effective candidates of m may be the same as the intrinsic candidates of m.

The joint distance may be determined for every intrinsic candidate of every mention in the mention dependency graph. The determination may only be done once per email. If m has no effective candidates, then m may be marked as unresolvable. If m has exactly one effective candidate, or one effective candidate with strictly smaller joint distance than other candidates, m may be resolved to that that single candidate. If the name disambiguator has not yet made a decision for m, then m may have multiple effective candidates which are tied in joint distance. A volume-based tie breaker may be used to pick a winner among these tied candidates. For example, for a candidate entity c, a volume may be determined as the total number of emails the candidate entity c sent to or received from the email sender and recipients. If one of the tied candidates has a strictly higher volume than the rest, that candidate may be selected as the winner. Otherwise, mention m may be marked as unresolvable.

Figure 3A:
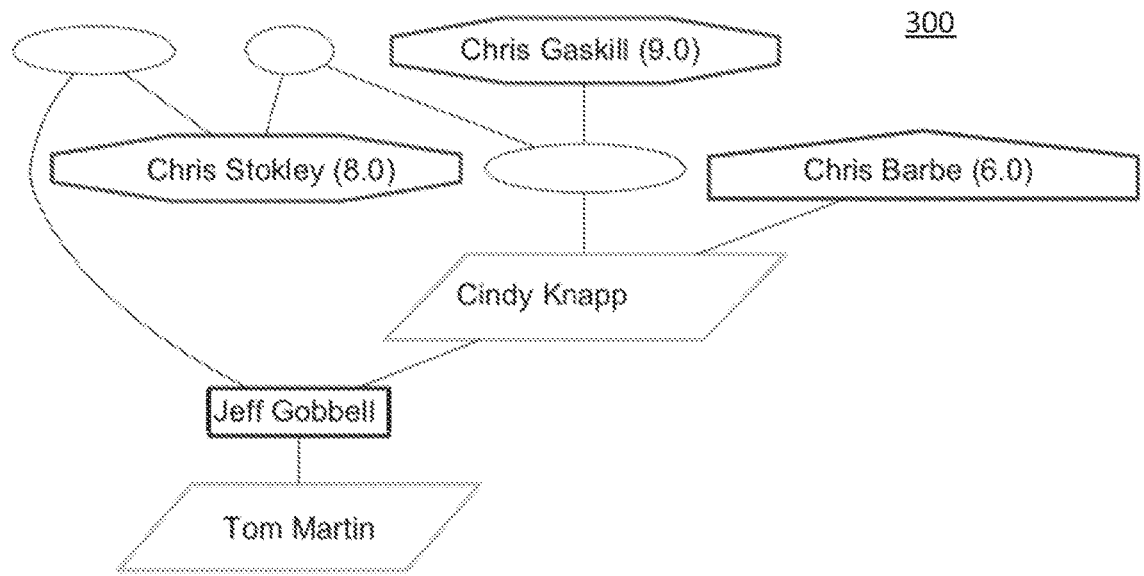
FIGS. 3A and 3B are graphs depicting example resolutions of entity mentions using joint distance, according to some embodiments of the disclosure.
Figure 3B:
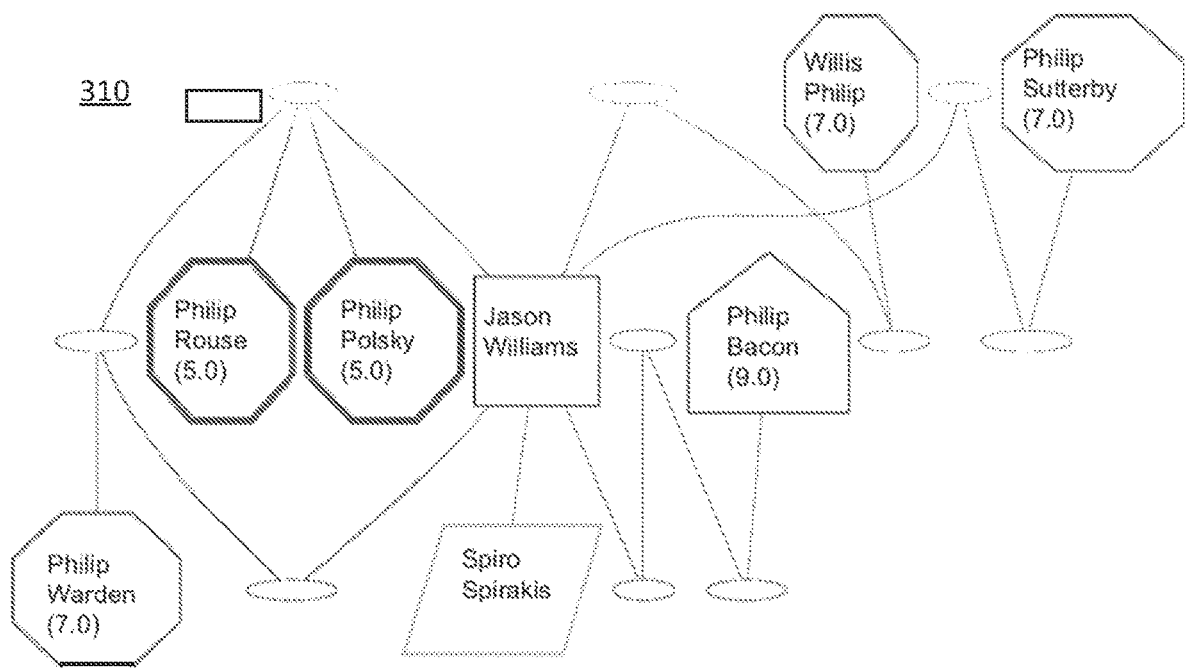

FIGS. 3A-3B show graphs depicting example resolutions of entity mentions using joint distance, according to some embodiments. FIG. 3A shows the shortest paths of the top three candidates for the mention Chris from the sender, Jeff Gobbell, and the recipients, Tom Martin and Cindy Knapp. The three candidates are Chris Barbe, Chris Stokley, and Chris Gaskill. The length of the shortest path from the sender Jeff Gobbell to Chris Barbe is 2 (Jeff Gobbell→Cindy Knapp→Chris Barbe). The length of the shortest path from Cindy Knapp to Chris Barbe is 1, and the length of the shortest path from Tom Martin to Chris Barbe is 3. Therefore, the joint distance of Chris Barbe from the sender and the recipients is 6 (2+1+3). The other two candidates are at a greater joint distance; Chris Stokley is at a joint distance of 8 and Chris Gaskill is at a joint distance of 9. Therefore, the name disambiguation algorithm predicts Chris Barbe to be the winning candidate, which is the correct prediction.

FIG. 3B shows an example in which a prediction is not made because there are two winning candidates at the same joint distance from the sender (Jason Williams) and the recipient (Spiro Spirakis). In this example, the correct candidate is much further away from the sender and the recipient. The correct candidate is at a joint distance of 9. There are five other Philips at a shorter joint distance from the sender and the recipient.

In some embodiments, to assign a score to a document, the spans in the document may be identified first. Then a score may be calculated for each of the spans in the document. The score of the span with the highest score in the document may be assigned as the final score for the document. In some embodiments, the score for a span may be adjusted if legal entities are identified in the text of the document containing the span, for example through the name disambiguation module. If the document is an email and one or more legal entities are identified in the text of the email, then the score for the span may be increased to adjust for the possibility that the email contains privileged communication. In some embodiments, the final score for a document itself may be adjusted based on the legal entities identified in the text of the document. The adjustment to the scores may include weighting the scores based on the number of legal entities identified, the number of times the legal entity mention appears in the document, the nature of the legal entities identified (such as whether the legal entities are attorneys or legal assistants), and whether the legal entities are principal actors in the relevant legal matter.

In some embodiments, the entities identified as the sender and/or recipient of documents, and within the context of documents, may be used to construct a social-linguistic hypergraph. In the social-linguistic hypergraph, each node may be an entity that has communicated with another entity in the documents (either as a sender or recipient). An edge may exist between two nodes when the entities have communicated with each other. In some embodiments, if the entities communicate heavily with each other, then the edge between the nodes may be weighted heavier. If the entities only communicate rarely with each other, then the edge between the nodes may be weighted lighter.

In some embodiments, an edge in the social-linguistic hypergraph may also connect more than two nodes, which is referred to as a hyperedge. For example, three nodes may be connected by an edge in the hypergraph if the entities represented by those nodes were all involved in a single communication (such as the one sender and two recipients of a single email). A hypergraph H may be represented as a pair H=(X, E), where X is the set of nodes, and E is the set of non-empty hyperedges. A hyperedge may be a set of nodes which represent entities that are connected by a single communication (such as the sender and recipients of an email). There may be no or limited limitations in the number of nodes that may be connect by one hyperedge. In some embodiments, a single edge in the hypergraph may be weighted based on the volume of communications that include all entities in the same communication (such a communication may be an email from any one entity to all the remaining entities). If there are more such communications, then the hypergraph may be weighted heavier; and if there are fewer such communications, then the hypergraph may be weighted lighter.

Figure 4:
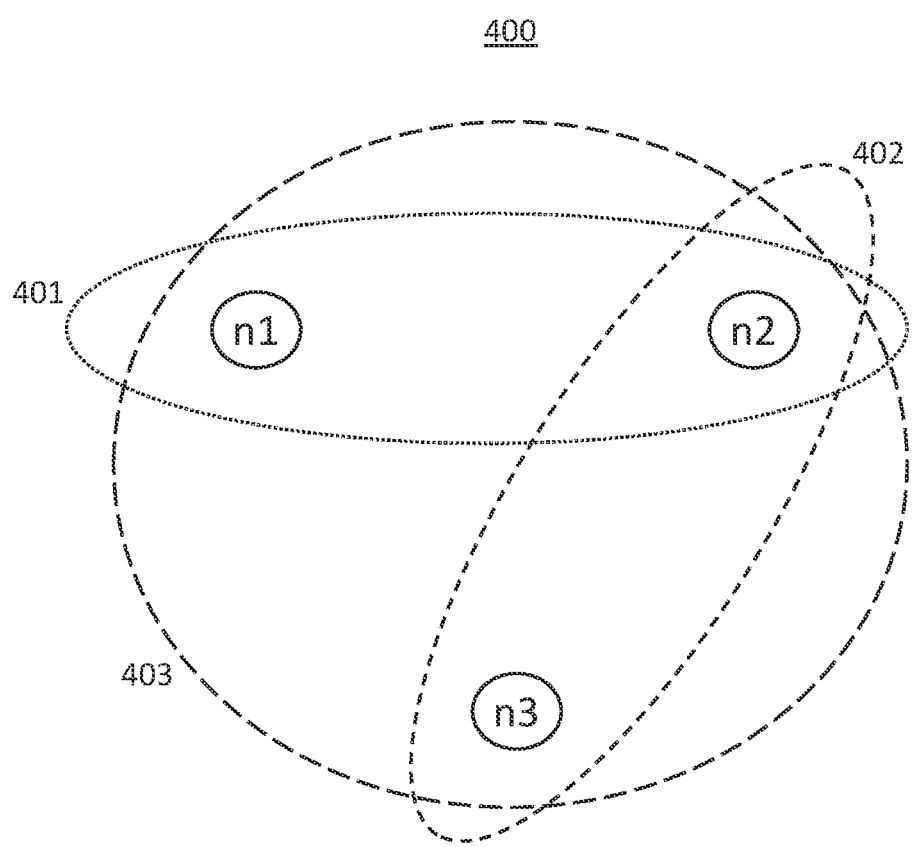
FIG. 4 illustrates a hypergraph with example hyperedges between multiple nodes in the hypergraph.

FIG. 4 shows a graphical representation of hypergraph 400 with three nodes: n1, n2, and n3. The three nodes may represent entities that communicate with each other. The communication between the nodes may be represented as hyperedges. Hyperedge 401 is the communications that take place only between n1 and n2. Hyperedge 402 is the communications that take place only between n2 and n3. And hyperedge 403 is the communication that takes place involving all three nodes. In this example, there is no hyperedge between n1 and n3, which means that all the communications between n1 and n3 also include n2.

In these and other embodiments, hypergraph 400 may embody multiple scenarios where n2 communicates with n1 and/or n3. Hyperedge 401 represents the situation where n2 communicates with only n1. Hyperedge 402 represents the situation where n2 communicates with only n3. Hyperedge 403 represents the situation where n2 communicates with both n1 and n3. Analyzing communications between the three nodes in a social-linguistic hypergraph may yield information instructive of the substance and nature of communication between the three nodes. For example, when n2 communicates with both n1 and n3 in hyperedge 403, it may be unlikely that communications of n2 are privileged. But when n2 communicates only with n3 in hyperedge 402, the communications of n2 may be more likely to be privileged. In these and other embodiments, hyperedge 402 may be weighted more heavily to be privileged when analyzing communications, whereas hyperedge 403 is weighted lower to contain privileged communications. As another example, when n2 communicates with both n1 and n3 in hyperedge 403, it may be unlikely that communications of n2 contain private personal information. But when n2 communicates only with n1 in hyperedge 401, the information shared may be more likely to be personal or private. In these and other embodiments, hyperedge 402 may be weighted more heavily to contain private personal information when analyzing communications, whereas hyperedge 403 may be weighted lower to contain private personal communications.

In addition to adjusting the scores of documents based on the identification of legal entities as the sender and/or recipient of the document, or within the context of the document, the scores may also be adjusted based on the social-linguistic hypergraph. If the communication is between entities with a heavily-weighted privilege edge in the hypergraph, then the privilege score for the communication may be more substantially increased. If the communication is between entities with a lightly-weighted privilege edge in the hypergraph, then the privilege score for the communication may be less substantially increased. And if the communication is between entities with no edge in the hypergraph, then the privilege score for the communication may not be adjusted based on the hypergraph.

In some embodiments, entity role detector may detect legal entities as the sender and/or recipient of a document, which may be used together with the social-linguistic hypergraph to adjust the privilege scores. The privilege score may be adjusted using various combinations of information, as shown by the following non-limiting examples. For instance, if the document is a communication between two nodes that are both legal entities with a heavily-weighted privilege edge between them, then the document's privilege score may be more substantially increased. If the document is a communication between two nodes that are both non-legal entities with a lightly-weighted privilege edge between them, then the document's score may be less substantially increased. If the document is a communication between two nodes that are both non-legal entities with a heavily-weighted privilege edge between them, then the document's privilege score may be moderately increased.

In some embodiments, the communication may mention a legal entity in the context of the communication. This legal entity may be identified through the entity mention detector and/or name disambiguator. Legal entity mentions may be employed along with the social-linguistic hypergraph to adjust the privilege scores. The disclosed subject matter may combine the information on legal entities in the sender/recipient of the communication, legal entities mentioned in the context of the communication, and/or the social linguistic hypergraph to adjust the privilege scores, which may be employed in various combinations to alter the scores. In these and other embodiments, if a document contains non-legal entities in a sender/recipient field of the document, contains a single non-legal entity in context of the document, and has a lightly-weighted privilege edge between the non-legal entities in sender/recipient field and the single non-legal entity in the hypergraph, then the document's privilege score may be less substantially increased. If a similar document contains non-legal entities in a sender/recipient field of the document, contains a single legal entity in context of the document, and has a similar lightly-weighted privilege edge between the non-legal entities in sender/recipient field and the single non-legal entity in the hypergraph, then the document's privilege score may be increased more substantially than the previous example.

The disclosed subject matter may be employed not only for the analysis of legally privileged content, but also for the analysis of other issues being investigated through e-discovery. Another aspect of the disclosed subject matter provides systems and methods for processing electronic communications to analyze and identify documents that are relevant with respect to a particular subject matter or issue. A processor of a computer having memory may receive documents to be analyzed for a particular issue, such as for responsiveness to a subject matter, sensitivity with respect to an issue, or personal or private information. The particular subject matter for the analysis may be referred to as the target issue. A topic model generator may produce a set of topics and topic weights for individual documents or for spans within the documents. The relevant target issue topics within the set of topics may be identified, which may be used to determine a score for the individual documents or for spans within the documents.

In some embodiments, a processor may receive a set of documents from one or more databases. The processor may generate a set of topics for each span in the dataset, where the set of topics include a subset of the target issue topics. The processor may generate a vector for each span including topic weights, where a probability is assigned to each topic in the set of topics. In some embodiments, a score may be assigned to each span by summing the probabilities in the vector that are assigned to a topic in the subset of target issue topics. In these and other embodiments, where the documents were split into smaller components to use as spans, a score may be assigned to a document, where the score is the highest score for a span within the document. The scores for documents may be used to determine the order in which to analyze the documents to identify the target issue in the documents. Alternately or additionally, a document may be marked as potentially relevant to the target issue if the score for the document is above a certain threshold.

The disclosed subject matter may be employed for the analysis of other subject matter by altering the topic model used for the analysis. As an example, the topic models may be altered to screen for responsiveness on a particular subject matter. In these and other embodiments, the topic model generator would be set to produce a set T for all topics for each span, and to create a subset $T_R$ of topics responsive to the particular subject matter. Using this topic model generator, the score generated by the analysis may be indicative of the degree to which the particular subject matter is exhibited in the document or the span. Alternately or additionally, the topic models may be set to screen for sensitive documents (such as documents that contain profanities or that discuss a sensitive topic), for private information (such as personally identifying information or medical information), or for topics related to a particular regulatory or compliance issue.

In some embodiments, the entities identified as the sender and/or recipient of documents, and within the context of documents, may be used to construct a social-linguistic hypergraph based on the target issue. The scores generated by the analysis may be adjusted based on the social-linguistic hypergraph, such as the weight of an edge with respect to the target issue. If the communication is between entities with a heavily-weighted edge in the hypergraph, then the score for the communication may be more substantially increased. If the communication is between entities with a lightly-weighted edge in the hypergraph, then the score for the communication may be less substantially increased.

Figure 5:
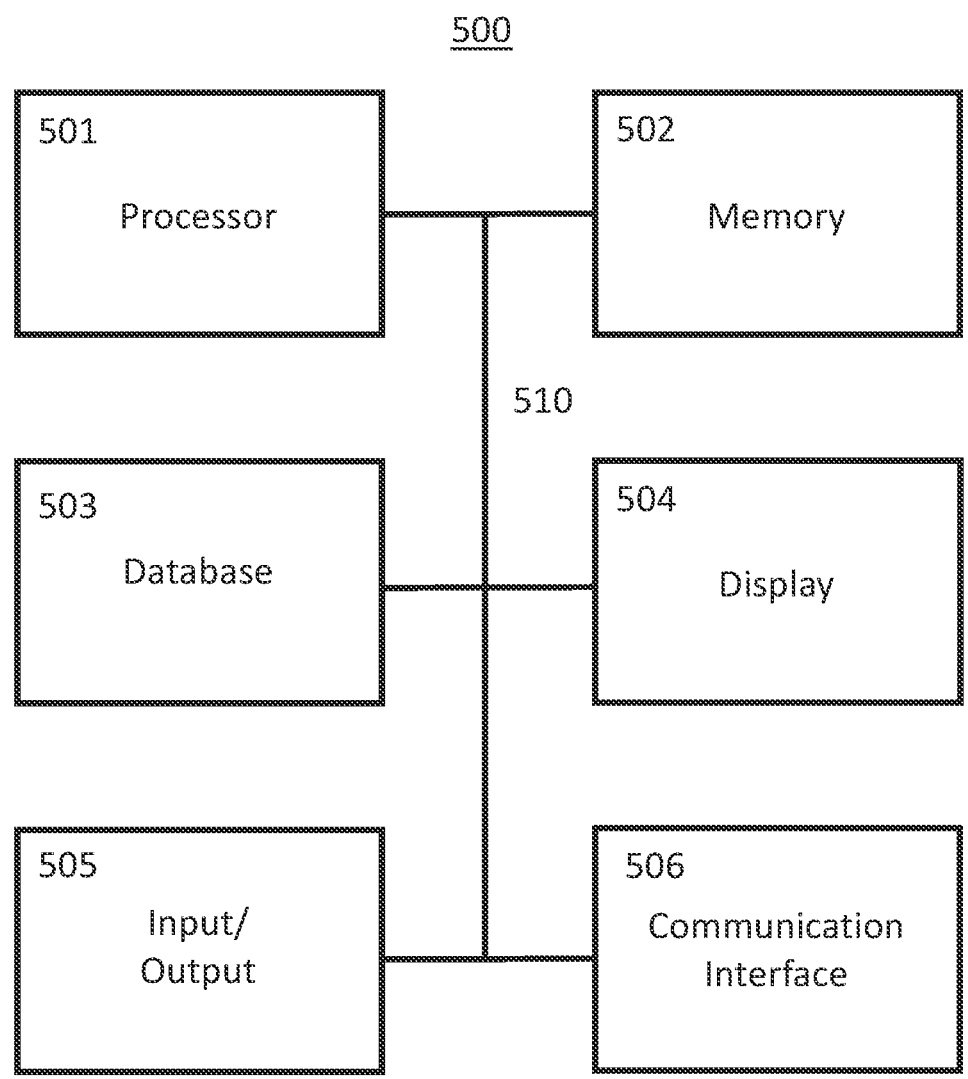
FIG. 5 depicts a block diagram illustrating an example computing system for execution of operations of various embodiments of the disclosure.

FIG. 5 shows a system architecture adapted to support one or more embodiments. FIG. 5 depicts a diagram illustrating an example computing system 500 for execution of the operations including various embodiments of the disclosure. As shown, the computing system 500 for implementing the subject matter disclosed herein may include a processing unit 501, memory 502, database/storage 503, display 504, data input/output (I/O) module 505, communication interface 506, and a bus 510 that couples elements 501-506.

The bus 510 may include any type of bus architecture. Examples include a memory bus, a peripheral bus, a local bus, etc. The processing unit 501 is an instruction execution machine, apparatus, or device and may include a microprocessor, a digital signal processor, a graphics processing unit, an application specific integrated circuit (ASIC), a field programmable gate array (FPGA), etc. The processing unit 501 may be configured to execute program instructions stored in memory 502 and/or database/storage 503 and/or received via data I/O module 505.

The memory 502 may include read only memory (ROM) and random access memory (RAM). Memory 502 may be configured to store program instructions and data during operation of the computing system 500. In various embodiments, memory 502 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 502 may also include nonvolatile memory technologies such as nonvolatile flash RAM (NVRAM) or ROM. In some embodiments, it is contemplated that memory 502 may include a combination of technologies such as the foregoing, as well as other technologies not specifically mentioned. When the subject matter is implemented in a computer system, a basic input/output system (BIOS), containing the basic routines that help to transfer information between elements within the computer system, such as during start-up, may be stored in ROM.

The database/storage 503 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the computing system 500.

It is noted that the methods described herein may be embodied in executable instructions stored in a computer readable medium for use by or in connection with an instruction execution machine, apparatus, or device, such as a computer-based or processor-containing machine, apparatus, or device. For some embodiments, other types of computer readable media may be used which may store data that is accessible by a computer, such as magnetic cassettes, flash memory cards, digital video disks, RAM, ROM, and the like may also be used in the example operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional example computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored in memory 502, including an operating system, one or more applications programs, program data, and other program modules. A user may enter commands and information into the computing system 500 through data I/O module 505. Data I/O module 505 may include mechanisms such as a keyboard, a touch screen, a pointing device, etc. Other external input devices (not shown) may be connected to the system via data I/O module 505. In some embodiments, external input devices may include video or audio input devices such as a video camera, a still camera, etc. Data I/O module 505 may be configured to receive input from one or more users of the computing system 500 and to deliver such input to processing unit 501 and/or memory 502 via bus 510.

A display 504 may also be connected to the bus 510. Display 504 may be configured to display output of the computing system 500 to one or more users. In some embodiments, a given device such as a touch screen, for example, may function as both data entry module and display. Other peripheral output devices, not shown, such as speakers and printers, may be connected to the computing system 500.

The computing system 500 may operate in a networked environment using logical connections to one or more remote nodes (not shown) via communication interface 506. The remote node may be another computer, a server, a router, a peer device or other common network node, and typically includes many or all of the elements described above relative to the computing system 500. The communication interface 506 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 506 may include logic configured to support direct memory access (DMA) transfers between memory 502 and other devices.

In a networked environment, program modules depicted relative to the computing system 500, or portions thereof, may be stored in a remote storage device, such as, for example, on a server. Other hardware and/or software to establish a communications link between the computing system 500 and other devices may be used.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements may not be strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 5. At least one component defined by the claims may be implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Example embodiments of the disclosed subject matter have been disclosed in an illustrative style. Accordingly, the terminology employed throughout should be read in an example rather than a limiting manner. Although minor modifications to the teachings herein may occur to those well versed in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

The invention claimed is:

1. A computer-implemented method for identifying and ranking potentially privileged documents using a machine learning topic model, at least a portion of the method being performed by a computer system comprising one or more processors, the method comprising:
  receiving, by the computer system, a document;
  generating a set of topics for the document by the computer system using a machine learning topic model selected from a group of machine learning topic models consisting of: Latent Dirichlet Allocation, Latent Semantic Analysis, Correlated Topic Modeling, Probabilistic Latent Semantic Analysis, non-negative matrix factorization, Parallel Latent Dirichlet Allocation, Pachinko Allocation Model, lda2vec, Gibbs Sampling Dirichlet Multinomial Mixture, Dirichlet Multinomial Mixture, and derivations thereof;
  generating, by the computer system, a vector of probabilities, each of the probabilities corresponding to a topic in the set of topics; and
  assigning, by the computer system, a score to the document based on the probabilities in the vector that are assigned to a subset of the topics, the score indicating a potential that the document is privileged.

2. The method of claim 1, further comprising:
  labelling, by the computer system, the document as potentially privileged if the document has a score above a certain threshold.

3. The method of claim 1, further comprising:
  generating, by the computer system, a master set of topics for the document, the set of topics being a subset of the master set of topics.

4. The method of claim 1, further comprising:
  altering, by the computer system, the score assigned to a first span if the first span contains a mention of a legal entity.

5. The method of claim 1, further comprising:
  altering, by the computer system, the score assigned to the document if the document contains a mention of a legal entity.

6. The method of claim 1, further comprising:
  extracting, by the computer system, a set of spans from the document,
  wherein generating a set of topics for the document includes generating a set of topics for each span of the set of spans,
  wherein generating the vector of probabilities includes generating a vector of probabilities for each span in the set of spans, and
  assigning, by the computer system, a score to one or more spans in the set of spans by mathematically combining the probabilities in the vector that are assigned to a subset of the topics,
  wherein assigning the score to the document is based on the scores assigned to the one or more spans in the set of spans.

7. The method of claim 6, wherein the assigning, by the computer system, of a score to the one or more spans in the set of spans is not performed for a first span of the one or more spans in the set of spans if at least one of: a language of the first span is unknown or cannot be detected, a number of tokens in the first span is less than a threshold, and the number of tokens in the first span is less than the threshold after names are removed from the first span.

8. The method of claim 6, further comprising:
  altering, by the computer system, the score assigned to a first span if a sender or a recipient of a document containing the first span is a legal entity.

9. The method of claim 1, further comprising:
  receiving, by the computer system, a set of documents that includes the document;
  for each document in the set of documents:
    generating a set of topics for the document by the computer system using a machine learning topic model selected from a group of machine learning topic models consisting of: Latent Dirichlet Allocation, Latent Semantic Analysis, Correlated Topic Modeling, Probabilistic Latent Semantic Analysis, non-negative matrix factorization, Parallel Latent Dirichlet Allocation, Pachinko Allocation Model, lda2vec, Gibbs Sampling Dirichlet Multinomial Mixture, Dirichlet Multinomial Mixture, and derivations thereof;
    obtaining, by the computer system, a vector of probabilities, each of the probabilities corresponding to a topic in the set of topics; and
    assigning, by the computer system, a score to the document by summing the probabilities in the vector that are assigned to a subset of the topics, the score indicating a potential that the document is privileged;

creating, by the computer system, a hypergraph comprising a set of entities based on communications between the set of entities in the set of documents; and weighting, by the computer system, an edge between one or more entities in the set of entities if the communications between the one or more entities is potentially privileged; and altering, by the computer system, the score assigned to a second document in the set of documents if the second document is a communication between entities with a weighted edge in the hypergraph.

10. One or more non-transitory computer-readable media comprising one or more computer-readable instructions that, when executed by one or more processors of a computer system, cause the computer system to perform the method of claim 1.

11. A computer-implemented method for identifying and ranking potentially privileged documents using a machine learning topic model, at least a portion of the method being performed by a computer system comprising one or more processors, the method comprising:

receiving, by the computer system, a document;

generating, by the computer system, a first vector that includes words of the document;

applying, by the computer system, a machine learning topic model to the first vector to generate a set of topics for the document;

generating, by the computer system, a second vector of probabilities, each of the probabilities corresponding to a topic in the set of topics; and assigning, by the computer system, a score to the document based on the probabilities in the second vector that are assigned to a subset of the topics, the score indicating a potential that the document is privileged.

12. The method of claim 11, further comprising:
labelling, by the computer system, the document as potentially privileged if the document has a score above a certain threshold.

13. The method of claim 11, further comprising:
generating, by the computer system, a master set of topics for the document, the set of topics being a subset of the master set of topics.

14. The method of claim 11, further comprising:
altering, by the computer system, the score assigned to a first span if the first span contains a mention of a legal entity.

15. The method of claim 11, further comprising:
altering, by the computer system, the score assigned to the document if the document contains a mention of a legal entity.

16. The method of claim 11, further comprising:
extracting, by the computer system, a set of spans from the document,
wherein generating a set of topics for the document includes generating a set of topics for each span of the set of spans,
wherein generating the second vector of probabilities includes generating a second vector of probabilities for each span in the set of spans; and
assigning, by the computer system, a score to one or more spans in the set of spans by mathematically combining the probabilities in the second vector that are assigned to a subset of the topics,
wherein assigning the score to the document is based on the scores assigned to the one or more spans in the set of spans.

17. The method of claim 16, wherein the assigning, by the computer system, of a score to the one or more spans in the set of spans is not performed for a first span of the one or more spans in the set of spans if at least one of: a language of the first span is unknown or cannot be detected, a number of tokens in the first span is less than a threshold, and the number of tokens in the first span is less than the threshold after names are removed from the first span.

18. The method of claim 11, further comprising:
receiving, by the computer system, a set of documents that includes the document;
for each document in the set of documents:
generating a set of topics for the document by the computer system using a machine learning topic model selected from a group of machine learning topic models consisting of: Latent Dirichlet Allocation, Latent Semantic Analysis, Correlated Topic Modeling, Probabilistic Latent Semantic Analysis, non-negative matrix factorization, Parallel Latent Dirichlet Allocation, Pachinko Allocation Model, lda2vec, Gibbs Sampling Dirichlet Multinomial Mixture, Dirichlet Multinomial Mixture, and derivations thereof;
obtaining, by the computer system, a second vector of probabilities, each of the probabilities corresponding to a topic in the set of topics; and
assigning, by the computer system, a score to the document by summing the probabilities in the second vector that are assigned to a subset of the topics, the score indicating a potential that the document is privileged;
creating, by the computer system, a hypergraph comprising a set of entities based on communications between the set of entities in the set of documents; and
weighting, by the computer system, an edge between one or more entities in the set of entities if the communications between the one or more entities is potentially privileged; and
altering, by the computer system, the score assigned to a second document in the set of documents if the second document is a communication between entities with a weighted edge in the hypergraph.

19. One or more non-transitory computer-readable media comprising one or more computer-readable instructions that, when executed by one or more processors of a computer system, cause the computer system to perform the method of claim 11.

20. A system comprising:
one or more processors; and
one or more non-transitory computer-readable media comprising one or more computer-readable instructions that, when executed by the one or more processors, cause the system to perform operations, the operations comprising:
receiving a document;
generating a set of topics for the document using a machine learning topic model selected from a group of machine learning topic models consisting of: Latent Dirichlet Allocation, Latent Semantic Analysis, Correlated Topic Modeling, Probabilistic Latent Semantic Analysis, non-negative matrix factorization, Parallel Latent Dirichlet Allocation, Pachinko Allocation Model, lda2vec, Gibbs Sampling Dirichlet Multinomial Mixture, Dirichlet Multinomial Mixture, and derivations thereof;

generating a vector of probabilities, each of the probabilities corresponding to a topic in the set of topics; and assigning a score to the document based on the probabilities in the vector that are assigned to a subset of the topics, the score indicating a potential that the document is privileged.

\* \* \* \* \*